(12) United States Patent
Miranda

(10) Patent No.: US 10,317,311 B2
(45) Date of Patent: Jun. 11, 2019

(54) LASER SCANNING LEAK DETECTION AND VISUALIZATION APPARATUS

(71) Applicant: KONICA MINOLTA LABORATORY U.S.A., INC., San Mateo, CA (US)

(72) Inventor: John Armando Miranda, Sunnyvale, CA (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 120 days.

(21) Appl. No.: 15/471,505

(22) Filed: Mar. 28, 2017

(65) Prior Publication Data

US 2017/0284891 A1    Oct. 5, 2017

Related U.S. Application Data

(60) Provisional application No. 62/316,448, filed on Mar. 31, 2016.

(51) Int. Cl.
*G01M 3/38* (2006.01)

(52) U.S. Cl.
CPC .................... *G01M 3/38* (2013.01)

(58) Field of Classification Search
CPC ........ G01M 3/04; G01M 3/38; G06K 9/4661; H04N 5/2256; H04N 5/332; H04N 9/31
See application file for complete search history.

(56) References Cited

U.S. PATENT DOCUMENTS

| | | | |
|---|---|---|---|
| 2002/0048307 A1* | 4/2002 | Schmidt | G01J 5/08 374/121 |
| 2006/0203248 A1 | 9/2006 | Reichardt et al. | |
| 2011/0243182 A1 | 10/2011 | Tetzlaff et al. | |

(Continued)

FOREIGN PATENT DOCUMENTS

| | | |
|---|---|---|
| DE | 10 2005 018 856 A1 | 10/2006 |
| EP | 2 634 747 A1 | 4/2013 |
| WO | 2009/021691 A1 | 2/2009 |

OTHER PUBLICATIONS

Extended European Search Report dated Jul. 26, 2017 in corresponding European Patent Application No. 17163420.7.

(Continued)

*Primary Examiner* — Marcus H Taningco
(74) *Attorney, Agent, or Firm* — Buchanan Ingersoll & Rooney PC

(57) ABSTRACT

A gas detecting apparatus and a method for detecting gas leaks are disclosed. The gas detecting apparatus includes an infrared (IR) detector configured to monitor a presence of one or more gases in a field-of-interest (FOI), wherein the IR detector generates IR light distribution information within the FOI to be analyzed to identify the presence of one or more gases for a gas leak detection; and a visible light projector configured to project a visible frame image that frames an outer edge of the FOI during the gas leak detection. The method for detecting gas leaks includes generating an infrared (IR) light distribution information within a field-of-interest (FOI) to be analyzed to identify the presence of one or more gases for a gas leak detection; and projecting with a visible light a visible frame image that frames an outer edge of the FOI during the gas leak detection.

20 Claims, 3 Drawing Sheets

(56) References Cited

U.S. PATENT DOCUMENTS

2013/0308064 A1\* 11/2013 LaDuke .................. H04N 5/64
                                                          348/744
2017/0284887 A1\* 3/2017 Miranda ................. G01M 3/04

OTHER PUBLICATIONS

RMLD-IS Brochure, Health Consultants, Houston, TX, Jan. 2015.
RMLD-IS User's Manual—IS Model, Health Consultants, Houston, TX, 2009.

\* cited by examiner

LASER SCANNING LEAK DETECTION AND VISUALIZATION APPARATUS

CROSS-REFERENCES TO RELATED APPLICATIONS

This application claims priority to U.S. Provisional Patent Application Ser. No. 62/316,448, filed on Mar. 31, 2016, the entire content of which is incorporated herein by reference.

FIELD OF THE INVENTION

The present disclosure relates to a laser scanning detection and visualization apparatus, and more particularly, to a laser scanning detection and gas leak visualization apparatus that can aid the user to quickly identify leaks within a field-of-interest (FOI) within a laser scanning window which is the actual/real scene field-of-view (or field of projection).

BACKGROUND OF THE INVENTION

Current competing solutions on the market today are hand-held remote methane leak detectors (RMLD) which detect gases by shooting stationary beams of both IR and visible laser light into a sampling space for the purpose of gas detection and device aiming, respectively. The visible laser in today's RMLD's output a single stationary beam, which results in a single visible dot into the sampling space.

A detecting light beam source (IR laser) when intersecting a gas leak, a RMLD audibly signals to the user that a gas has been detected. At this point, the user can move closer to a leak but the single detecting light beam must continue to intersect the gas plume cloud. One problem with this solution is that gas plume clouds can dissipate making the RMLD appear to give unstable intermittent results. In addition, the RMLD must continuously be moved back and forth by hand in order to hunt for the leak. The RMLD readings that are provided to the user of the RMLD is gas concentration detected but the actual location of the leak, demarcation of leaks in-field sample space, shape of the gas plume, quantity of gas (rate of leakage) is not provided to the user as could be achieved by a scanning laser (and other "rastering" techniques, including, for example, solid state LiDAR and polygon mirrors).

For example, known RMLD products emit one IR (Infrared) beam and can only detect a gas along the IR beam path.

SUMMARY OF THE INVENTION

In consideration of the above issue, it would be desirable to have a gas leak visualization apparatus that can aid the user to quickly identify leaks within a field-of-interest (FOI) within a laser scanning window which is the actual/real scene field-of-view (or field of projection), and reduces the cycle time and the costs associated with identifying gas leaks which could pose a danger to surrounding people and assets.

A gas detecting apparatus is disclosed, comprising: an infrared (IR) detector configured to monitor a presence of one or more gases in a field-of-interest (FOI), wherein the IR detector generates IR light distribution information within the FOI to be analyzed to identify the presence of one or more gases for a gas leak detection; and a visible light projector configured to project a visible frame image that frames an outer edge of the FOI during the gas leak detection.

A method is disclosed for detecting gas leaks, comprising: generating an infrared (IR) light distribution information within a field-of-interest (FOI) to be analyzed to identify the presence of one or more gases for a gas leak detection; and projecting with a visible light a visible frame image that frames an outer edge of the FOI during the gas leak detection.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
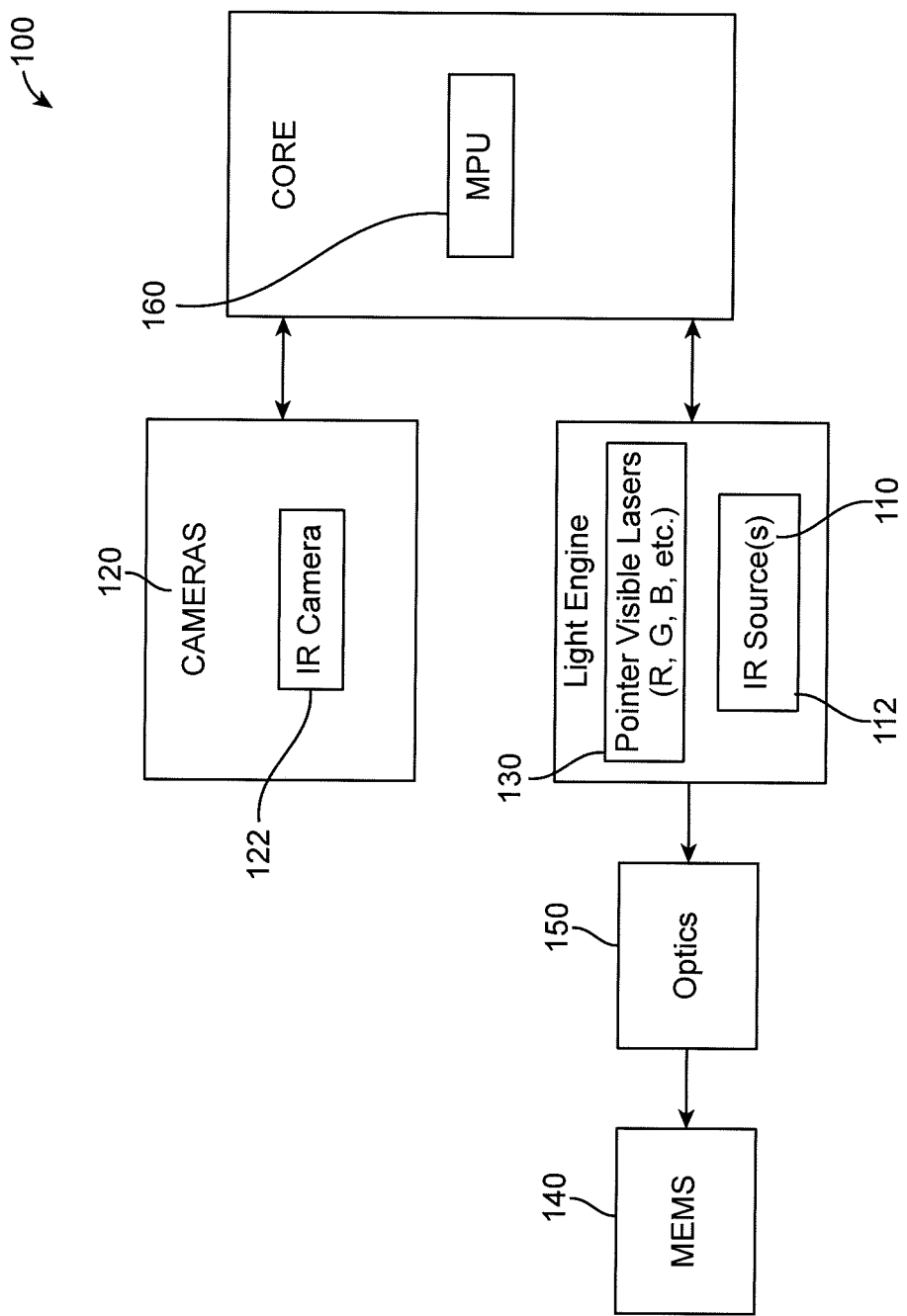
FIG. 1 is an illustration of a gas detection apparatus with an integrated pointer in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a laser scanning gas leak detector and visualization apparatus is disclosed, which is able to "frame" the actual field-of-interest (FOI), and project onto the field-of-interest for the purpose locating the apparatus field-of-view and for projecting annotations/markings/highlights to assist the user in locating gas leaks. In this exemplary embodiment, the laser scanning gas leak detector is preferably a hand-held type, which a user can easily carry around the field to be inspected. However, the gas leak detector can be mounted on an automobile, a plane, or even a building, which is stationary.

In accordance with an exemplary embodiment, the gas detection apparatus may perform gas leak detection, discern gas type, provide local gas leak location and distance from the laser apparatus, and provide geo-location when GPS enabled, and create 3D (three-dimensional) point cloud data. For example, the system may use laser(s), sensor(s) (APD), camera(s), and optics to identify the gas(es), and visible lasers to annotate/mark/point to gas leak sources and seepage locations, as well as framing the laser scan field-of-interest for ease of precise pointing of the apparatus. Utilizing the system capabilities for distance ranging, for example, time of flight, and/or a distance measurement system using the triangulation principle, the apparatus can be configured to precisely geo-locate gas leaks within the actual FOI (field-of-interest).

In accordance with an exemplary embodiment, imaging and point cloud data captured can be obtained about the gas leak and the surrounding scene, which can be processed algorithmically to annotate the actual field of projection in real-time. Thus, allowing the user, for example, to see the gas leak locations with a visible laser by projecting annotations, marks, and/or highlights onto adjacent surfaces and/or objects in actual field-of-interest. Additionally, leak location can be shown concurrently on a display as part of the apparatus with same in-field notations overlaid about the leak. For example, in accordance with an exemplary embodiment, the user with visual and stored gas leak information (in-field photo, leak rate, gas concentration, gas type, GPS (global positioning system) location, etc.) could grade the leak, report, and schedule appropriate follow-up action.

In accordance with an exemplary embodiment, the laser scanning device as disclosed herein can include features such as the "framing" of the field-of-interest being sampled for gas leaks, and the "projection" of in-field-of-interest annotations, marking, highlighting, etc. In accordance with an exemplary embodiment, the apparatus 100 as shown in FIG. 1 can provide simultaneous "projection" and "scanning" utilizing a light engine containing a micro-electrical-mechanical system (or MEMs), and a rastering system such as a micro-electrical-mechanical system (MEMs), which can enable the scanning of lasers (including Visible & IR Lasers). In combination with, for example, IR (Infrared) & RGB cameras, the apparatus 100 can enable a user to sense gas leaks, and create 3D point clouds of gas leaks and surrounding objects to determine the exact location of gas leakage points and/or areas.

FIG. 1 is an illustration of a gas detection apparatus 100 with an integrated pointer in accordance with an exemplary embodiment. As shown in FIG. 1, the gas detection apparatus 100 can include an IR Laser 110, one or more cameras 120, at least one visible laser 130 (for example, green, red, blue, yellow, white or any combination, for example, of green, red, blue, yellow, and/or white) for highlighting/annotating/marking leaks in the field-of-interest (FOI), a laser controller 140, for example, a MEMs or laser actuation device, an optics module 150, for example, a scanning MEMs mirror, and a micro processing unit (MPU or microprocessor) 160. In accordance with an exemplary embodiment, the field-of-view of the one or more cameras 120 can coincide with the laser scanning window of the IR laser 110 and the at least one visible laser 130 as generated by the scanning MEMS mirror of the laser controller 140.

In accordance with an exemplary embodiment, the MPU 160 preferably is capable of storing frames of data and editing the frames of data algorithmically to support an accurate assessment of gas leaks and projection of lasers onto the field-of-interest. For example, in accordance with an exemplary embodiment, the MPU 160 can include a graphical processing unit (GPU) with an integrated or a separate frame buffer.

In accordance with an exemplary embodiment, the one or more cameras 120 can include, for example, multi-spectral cameras, hyperspectral cameras, RGB cameras, black and white (B&W) cameras, IR cameras, thermal cameras, and photodiodes. In addition, the one or more cameras 120 can have various types of sensors and/or arrays of sensors. In accordance with an exemplary embodiment, the apparatus 100 can include an optics module 127 (FIG. 2) that can include optical filters including band-pass filters, taking optics and opto-mechanics.

In accordance with an exemplary embodiment, the IR laser 110 includes an IR source 112. The IR source 112 is configured to generate a pulsating or solid beam of IR light, which is received by the laser controller (or laser controller module) 140, which is configured to direct or steer the light sources in a raster pattern. In accordance with an exemplary embodiment, the laser controller 140 comprises a driver of the visible light source.

In accordance with an exemplary embodiment, the optics module 150 as disclosed herein can be referred to as a "combiner". After pulsed light packets exit the optics module 150, the laser controller (or MEMs module) 140 will continuously raster IR light and selectively place visible light to create notations and other graphics into the scene field of interest. In accordance with an exemplary embodiment, the laser controller (or MEMS) 140 directs the IR and visible light in a 2D (two-dimensional) raster pattern comprised of pulsed packets of light for each and every raster element in the scanning field of interest.

In accordance with an exemplary embodiment, the optics module 150 can be configured to perform beam shaping, collimating, combining, and light mixing along a common path, for example, into a two-dimensional pattern, which can be comprised of a raster or matrix of individual beams of light, which are scanned across the defined two-dimensional pattern. The optics module 150 can also be configured to direct the pulsating or solid train of visible light into a visible frame (or light frame), which frames the two-dimensional pattern of IR light on the field-of-interest during gas leak detection. For example, the two-dimensional pattern can be a defined shape, such as a rectangle, ellipse, oval, square, or other suitable shape. In accordance with an exemplary embodiment, the projected pattern can be projected as a two-dimensional pattern, however, upon reaching the field-of-interest, a three-dimensional (3D) pattern can be formed (X, Y, Z). Accordingly, in accordance with an exemplary embodiment, the apparatus 100 can have the capability to adjust projection shapes, images, and video to correct for surfaces specific to the scanned scene. In accordance with an exemplary embodiment, this adjustment can be enabled via the IR point cloud information that is captured by the returning IR signal from the field-of-interest or scene.

In accordance with an exemplary embodiment, rather than the laser controller (or module) 140 generating the pulsating beam or IR light, the pulsating effect can be generated by the IR source 112, which can be configured to project a plurality of beams of radiation (or pulses) in the defined pattern at a pre-determined repetitive rate or timing sequence.

In accordance with an exemplary embodiment, the plurality of emitted beams of radiation or light in the defined pattern pass through a volume of gas within the field-of-interest, and energy in the form of light from the laser beams is absorbed at certain wavelengths, depending on the properties of the detected gas. The light from the apparatus 100 is scattered from the target, and returns to the at least one camera 120, more specifically, the IR camera 122, where the light or energy is collected and focused onto the IR camera 122 where the light or energy can be analyzed to identify the presence of one or more gas or gas-like substances in the field-of-interest. For example, carbon monoxide absorbs light or energy at a wavelength of about 4.2 µm to 4.5 µm. The energy in the wavelength can be compared to a wavelength outside of the absorption range, and the difference in energy between the two wavelengths is proportional to the concentration of gas present. The gas concentration information obtained from the field-of-interest can be used to identify an outline shape of the gas plume by thresholding the concentration data, and this outline shape can be projected by the visible laser light or superimposed on the display. In addition, the distribution of the gas concentrations in the field-of-interest can be used to identify the location of the leakage source in the scene, which is usually a crack on the ground or a seam between pipes, and the identified source location can be marked in the field by the visible laser or by the display.

Figure 2:
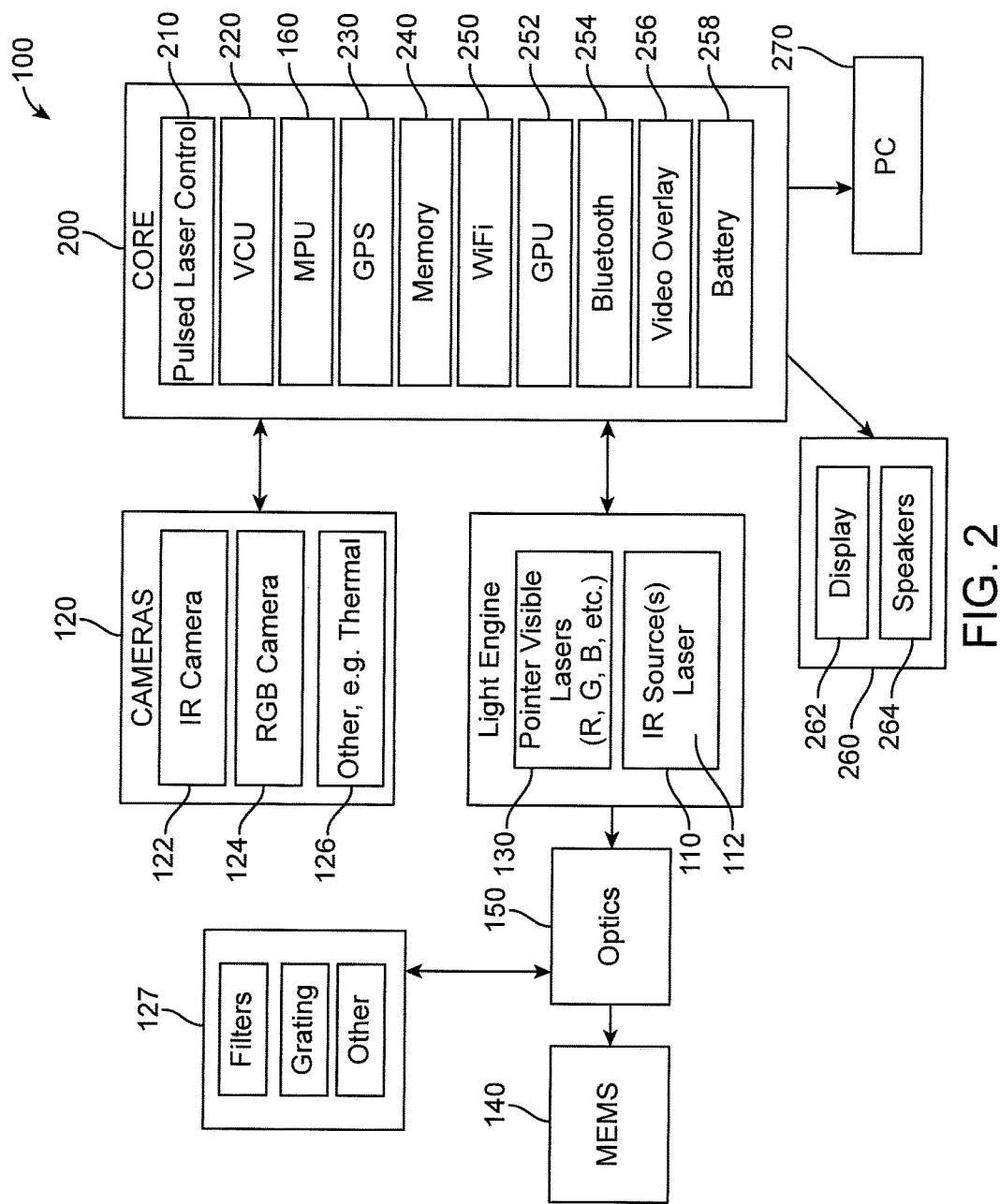
FIG. 2 is an illustration of a gas detection apparatus with an integrated pointer in accordance with another exemplary embodiment.

In accordance with an exemplary embodiment, the apparatus 100 can include at least one camera 120, for example an IR camera 122, an optional RGB camera 124, and an optional thermal camera 126 (FIG. 2). In accordance with an exemplary embodiment, the IR 122 camera can be configured to capture the infrared (IR) light or energy returning from the defined pattern, which can be depicted on a display to assist the operator with identifying the location of the detected gas. In accordance with an alternative embodiment, the IR camera 122 can be a multi-spectral camera, a hyper-spectral camera, a RGB camera, and/or a black & white (B/W) camera.

The MPU 160 is preferably a microprocessor, which includes a central processing unit (CPU) on a single integrated circuit (IC), or at most a few integrated circuits. The microprocessor is a preferably a multipurpose, clock driven, register based, programmable device that accepts digital data or binary data as input, processes it according to instructions stored in its memory, and provides results as output. In accordance with an exemplary embodiment, the MPU 160 is configured to receive and compute information received from the IR laser 110, the one or more cameras 120, the plurality of visible lasers 130, the laser controller or laser actuation module 140, and the optics module 150. In accordance with an exemplary embodiment, the MPU 160 accesses to a memory (not shown) to refer spectral information of multiple characterized gases of interest against which the signal from the gas can be compared against in order to determine the gas type. In accordance with an exemplary embodiment, the MPU 160 communicates with a display 262 (FIG. 2).

In accordance with an exemplary embodiment, the apparatus 100 includes at least one visible color laser 130, which is projected onto the field-of-interest (FOI) in the form of a frame or framing feature, for example, a light frame. The at least one visible light color laser 130 can be, for example, a green, red, blue, yellow, white or any combination of visible for highlighting/annotating/marking leaks in the field-of-interest. In accordance with an exemplary embodiment, the at least one visible color laser 130 is sent through the laser controller module 140 and the optics module 150 such the at least one visible light is projected in a pattern, which frames an outer edge of the defined area of the pulsating IR laser 112, which allows an operator and/or user of the laser to visually observe the area in which the apparatus 100 is searching.

FIG. 2 is an illustration of a gas detection apparatus 100 with an integrated pointer in use in accordance with another exemplary embodiment. As shown in FIG. 2, the gas detection apparatus 100 can include an IR Laser and IR camera/detector 110, one or more cameras 120, at least one visible laser 130 (for example, green, red, blue, yellow, white or any combination) for highlighting/annotating/marking leaks in the field-of-interest (FOI), a laser controller (or control module) 140, for example, a MEMs or laser actuation device, an optics module 150, for example, a scanning MEMs mirror, and a core unit 200.

In accordance with an exemplary embodiment, the core unit 200 can include a pulsed laser controller 210, a VPU (vision processing unit) 220, a MPU (or CPU) 160, a GPS module (global positioning system) 230, one or more memories 240, and a network interface (I/F) 250, such as a network connection, a battery 258, and peripherals 260. In accordance with an exemplary embodiment, the battery 258 can be a rechargeable battery source. In addition, the gas detection apparatus 100 can include a GPU (graphics processing unit) 251 with frame buffers for processing camera data in real time, and a video overlay 253 configured to support overlay of gas leak information/imagery onto not only the real (or actual) scene but onto the display screen or display 262. In accordance with an exemplary embodiment, the gas detection apparatus 100 can be Bluetooth® 252 enabled, such that the apparatus 100 can have wireless connectivity with other local devices and/or computers 270.

In accordance with an exemplary embodiment, the one or more cameras 120 can include, for example, an IR camera 122, a RGB camera 124, and other cameras, for example, a thermal camera, a multi-spectral camera, a hyper-spectral camera, and photodiodes 126.

In accordance with an exemplary embodiment, the core unit 200 can include a pulsed laser controller 210 for controlling the laser power, timing, and pulse, the VPU (vision processing unit) 220 configured to support computer vision on board algorithms, the MPU 160, the GPS module (global positioning system) 230 for providing location and time information during use of the apparatus 100. The apparatus 100 can also include the MPU 160 and one or more memories 240 for storing software programs and data. In accordance with an exemplary embodiment, the processor or MPU 160 carries out the instructions of a computer program, which operates and/or controls at least a portion of the functionality of the apparatus 100. The apparatus 100 can also include an operating system (OS), which manages the computer hardware and provides common services for efficient execution of various software programs.

The apparatus 100 can also include peripherals 260 such as a display unit or graphical user interface (GUI) 262, and/or an audio speaker 264. In accordance with an exemplary embodiment, the apparatus 100 can be configured to provide an audible sound from the speaker 264 when a gas leak is detected. In accordance with an exemplary embodiment, for example, the network interface (I/F) 250 is preferably provided for communication with a display unit or graphical user interface (GUI) 262 via a connection, such as a cable, for example, a USB port, or a wireless connection, for example, Wi-Fi 250, for example, using radio frequency (RF) and/or infrared (IR) transmission.

In accordance with an exemplary embodiment, the apparatus 100, for example, can include an RGB camera 123, a display screen 262 to support actual image overlaid with digital leak marking & leak data superimposed, a GPS module 230 for precise leak geo-location, Wi-Fi 250 to support wireless transmission of leak detection data, and a vision processing unit (VPU) 220 to manage, for example, point cloud data and computer vision onboard algorithms.

In accordance with an exemplary embodiment, the peripherals 260 can include a display 262, which can be a touch screen display, such that the user can press on (or touch), for example, an identified gas leak on the touch screen display 262 to capture an image of the leak along with the geo-location data.

In accordance with an exemplary embodiment, a remote peripheral or device 270 can be, for example, a tablet, a mobile device, a personal computer (PC) and/or other suitable device, which can be connected via, for example, Wi-Fi 250 or Bluetooth 252 to the apparatus 100. In accordance with an exemplary embodiment, the remote peripheral or PC 270 can receive and store data detected by the apparatus 100 relating to leaks and pertinent and/or relevant data in real-time. For example, in accordance with an exemplary embodiment, the user using the display 262 on the apparatus 100 and/or the remote peripheral 270 can immediately grade the leak or review each of the leak images to grade the leak at a later time (for example, after further measurements).

In accordance with an exemplary embodiment, the onboard algorithms of the apparatus 100 may also provide automatic decision making regarding leak grading, safety threat assessment levels considering gas leak attributes, and the geographic location determined via GPS and maps (for example, Google Maps®) of the leak in relation to public buildings, homes, commercial buildings, critical infrastructure or other). In accordance with an exemplary embodiment, the automatic determination can enable consistent assessment of gas leak. In accordance with an exemplary embodiment, the apparatus 100 can be configured to allow the user and/or operator the ability to input data into the data in real-time onto the apparatus 200, for example, the display 262, or via remote peripherals 270 and to tag this information for each detected gas leak. In addition, with the built-in Wi-Fi 250 or Bluetooth 252 modules, the apparatus can allow the user and/or operator to upload data onto a remote database (for example, vehicle based or cloud).

In accordance with an exemplary embodiment, a variation of this disclosure is to use only camera technology to identify a gas leak (not IR laser with IR Camera combo), and to incorporate a separate laser pointer, which can for example, can compute or calculate distance to leaks in the field-of-interest. In accordance with an exemplary embodiment, for example, the separate laser pointer can be a motorized or other mechanical means laser pointer. In addition, the apparatus 100 may use a solid state LiDAR, for example, to help measure distances and for imaging of detected gases and other means to perform rastering.

Figure 3:
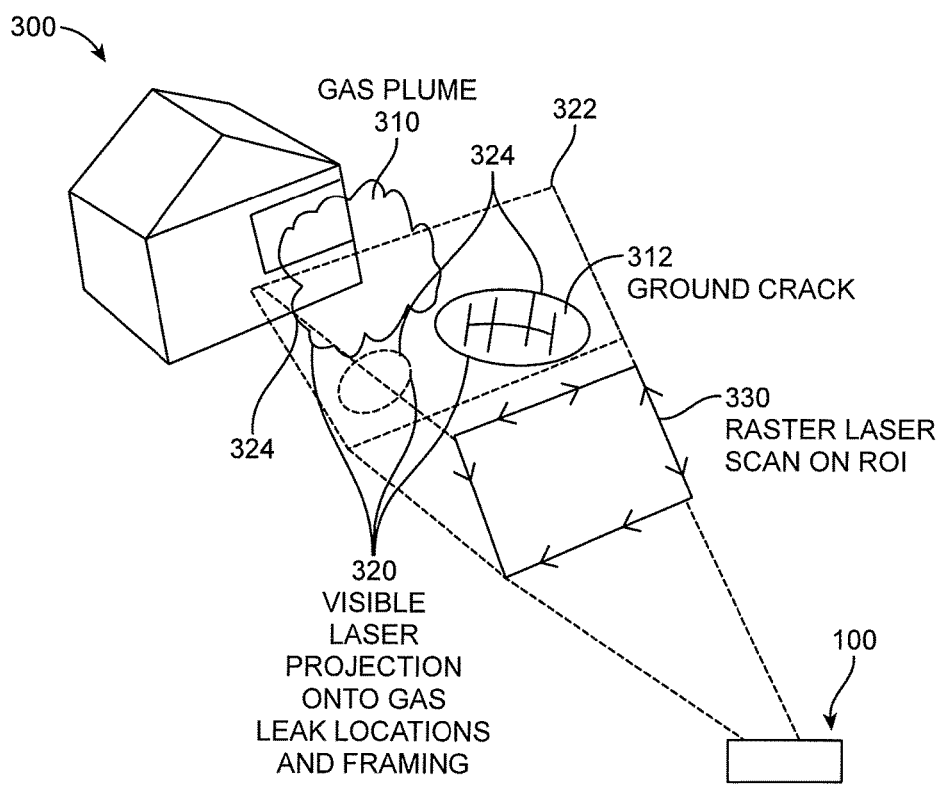
FIG. 3 is an illustration of a gas detection apparatus with an integrated pointer in use in accordance with a further exemplary embodiment.

In accordance with an exemplary embodiment, as shown in FIG. 3, a user can point the hand-held laser scanning gas leak detector apparatus 100, which emits a pulsating beam of short duration of IR light in a two-dimension pattern 330 onto a field-of-interest (FOI) 300 by hand and moves the apparatus 100 to and around the field-of-interest 300 and begins to search for gas leaks 310, which can include, for example, a ground crack 312 releasing a gaseous material. In accordance with an exemplary embodiment, the apparatus 100 will project markings 320 (for example, a visible light frame 322, which frames the pulsating beam of IR light, and/or visible light outlines and marking depicting detected gas leaks 324) onto objects in the field-of-interest 300 to assist the user to visually identify the area being analyzed.

In accordance with an exemplary embodiment, once a leak is identified and the notation is projected, the user in practice may move the apparatus 100 but the projection will stay on the encountered gas leaks (via internal tracking algorithm of the leak features). In accordance with an exemplary embodiment, should the leak move out of the scanning and gas detection field-of-view, the apparatus 100 can provide audible signals, projected visual signals, or notations on the display 262 to help the user or operator to return to the encountered leak(s).

In accordance with an exemplary embodiment, the apparatus 100 may have a display 262 (FIG. 2) that shows the field-of-interest 300 including the projected laser markings 322 that frames the emitted pulsating beam of short duration of IR light in the two-dimension pattern 300 and visible laser markings 324 of detected gases 310. In accordance with an exemplary embodiment, as the user searches for gases, in the condition where gas is not detected, the display unit 262 of the apparatus 100 displays only the projected frame 322 and the scene being analyzed.

In the situation in which, for example, a gas leak 310 is detected within the field-of-interest 300 during the searching for gas, the apparatus 100 may sound an audible confirmation. In addition, at that instant in time in which the gas is detected, the apparatus 100 can project marking features, for example, visible light of a different color from the light frame, onto the surroundings nearest the leak to show area of high gas concentration relative to surroundings. For example, the projected marking features can include any shape to mark the location of the leak or seepage locations. In addition, different line types, or colors can be projected by the apparatus 100 to demarcate variations in gas concentration or different gas types encountered by the apparatus 100. In addition, distance information may be supplementary projected to the field-of-interest 300. Other examples of such supplemental information would be a kind of gas (in case the detector can detect multiple kinds), a concentration, and/or a warning level.

In accordance with an exemplary embodiment, multiple leaks or seepage points may be encountered within the field-of-interest 300 and in this case the laser markings can designate the location of each of such leakage points within the field-of-interest (FOI) 300. In addition, using laser-ranging techniques coupled with GPS each leak geo-location can be stored on the apparatus 100 in one or more of the memories 240 along with a picture (or image) of the leak location (for example, utilizing B/W or RGB Image sensor array). Since the laser scanning also creates a point-cloud the gas leak locations can be rectified with features within the scene, for example, sidewalks, rocks, trees, buildings, street curbs, etc.

In accordance with an exemplary embodiment, for example, using point cloud distance data and geo-location, a leak's location may be rectified with any and all industrial plant components (for example, valves, pumps, equipment, pipes, etc.) within, for example, oil & gas and petrochemical plants. This type of functionality can benefit both hand held and permanent installation of this apparatus 100 in support of leak detection activities such as leak detection and repair (LDAR) monitoring.

For instance, although the above-mentioned exemplary embodiments use an IR laser 110 to actively detect gas leakage, the present invention may be achieved with using a passive way (or approach) for the gas leakage detection. In other words, the gas detection by the IR camera 122 can be achieved with using IR light in the environment, without actively shooting the IR laser dots into the field-of-interest 300. In such case, the frame projection by the visible laser 130 is carried out so that the projected frame agrees to the viewing angle (or the detection angle) of the IR camera, which is known.

In addition, the area of the field-of-interest may be reduced once a gas leakage is detected. By increasing the intensity or resolution of the IR laser dots in the reduced field-of-interest 300, the local thermal contrast can be increased and thereby the signal intensities from the field-of-interest 300 can increase. This also can be achieved by supporting multi bands of laser lights along the same light path which may return to the camera(s), for example, for the direct comparison of a reference signal vs. second band along the same light path. In addition, multiple IR lasers may be used to recognize the kinds of the detected gases in the same reduced field-of interest, or multiple discrete reduced field-of-interests.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A gas detecting apparatus, comprising:
   an infrared (IR) light projector configured to generate a two-dimensional pattern of IR light, the two-dimensional pattern of IR light configured to be projected into a field-of-interest;
   an infrared (IR) detector configured to monitor a presence of one or more gases in the field-of-interest, wherein the IR detector generates IR light distribution information within the field-of-interest to be analyzed to identify the presence of one or more gases for a gas leak detection from the IR light being projected into the field-of-interest; and
   a visible light projector configured to project a visible frame image that frames an outer edge of the two-dimensional pattern of IR light being projected into the field-of-interest during the gas leak detection.

2. The gas detecting apparatus according to claim 1, the visible light projector comprising:
   a visible light source configured to generate a beam of visible light;
   a first scanner configured to scan the visible light into an area covering the field-of-interest; and
   a controller configured to control at least one of the visible light source and the first scanner to project the visible frame image.

3. The gas detecting apparatus according to claim 2, wherein the controller comprises a driver of the visible light source.

4. The gas detecting apparatus according to claim 2, further comprising:
   an IR light projector comprising:
      an IR laser source configured to generate a beam of IR light; and
      a second scanner configured to scan the beam of the IR light into the two-dimensional pattern of IR light being projected into the field-of-interest;
   wherein the controller is configured to control at least one of the IR laser source and the second scanner to project the beam of the IR light into the two-dimensional pattern of IR light being projected into the field-of-interest; and
   wherein the IR detector generates the IR light distribution information based on the IR light scanned in the two-dimensional pattern of IR light being projected into the field-of-interest.

5. The gas detecting apparatus according to claim 4, wherein the first scanner and the second scanner share a single scanning device.

6. The gas detecting apparatus according to claim 1, wherein the IR detector comprises:
   an IR camera generating an IR image of the field-of-interest as the IR light distribution information.

7. The gas detecting apparatus according to claim 1, wherein the two-dimensional pattern of IR light being projected into the field-of-interest is rectangular, elliptical, or oval.

8. The gas detecting apparatus according to claim 1, wherein the visible frame of light is one or more of green, red, blue, yellow, white, or a combination of green, red, blue, yellow, and/or white.

9. The gas detecting apparatus according to claim 1, wherein the two-dimensional pattern of IR light is projected as solid beams of IR light.

10. The gas detecting apparatus according to claim 1, wherein the two-dimensional pattern of IR light is projected as pulsating beams of IR light.

11. The gas detecting apparatus according to claim 1, further comprising:
    a touch screen display configured to capture an image of a gas leak with geo-location data upon touch by a user.

12. The gas detecting apparatus according to claim 1, further comprising:
    a display unit configured to display the visible frame image that frames an outer edge of the two-dimensional pattern of IR light being projected into the field-of-interest during the gas leak detection and the presence of the one or more gases only upon detection.

13. A method for detecting gas leaks, comprising:
    projecting a two-dimensional pattern of IR light into a field-of-interest;
    generating infrared (IR) light distribution information on the field-of-interest to be analyzed to identify the presence of one or more gases for gas leak detection from the IR light being projected into the field-of-interest; and
    projecting a visible frame image that frames an outer edge of the two-dimensional pattern of IR light into the field-of-interest during the gas leak detection.

14. The method according to claim 13, wherein the projecting of the visible frame image comprises:
    generating a beam of visible light; and
    scanning the beam of the visible light into an area covering the field-of-interest.

15. The method according to claim 14, further comprising:
    generating a beam of IR light; and
    scanning the beam of the IR light into the two-dimensional pattern being projected into the field-of-interest.

16. The method according to claim 15, wherein the scanning the beam of the visible light and the scanning the IR light are carried out by a common scanner.

17. The method according to claim 13, wherein the IR distribution information comprises an IR image of the field-of-interest.

18. The method according to claim 13, wherein the two-dimensional pattern of IR light being projected into the field-of-interest is rectangular, elliptical, or oval; and
    the visible frame of light is one or more of green, red, blue, yellow, white, or a combination of green, red, blue, yellow, and/or white.

19. The method according to claim 13, comprising:
    projecting the two-dimensional pattern of IR light solid beams of IR light.

20. The method according to claim 13, comprising:
    projecting the two-dimensional pattern of IR light as pulsating beams of IR light.

* * * * *